UNITED STATES PATENT OFFICE.

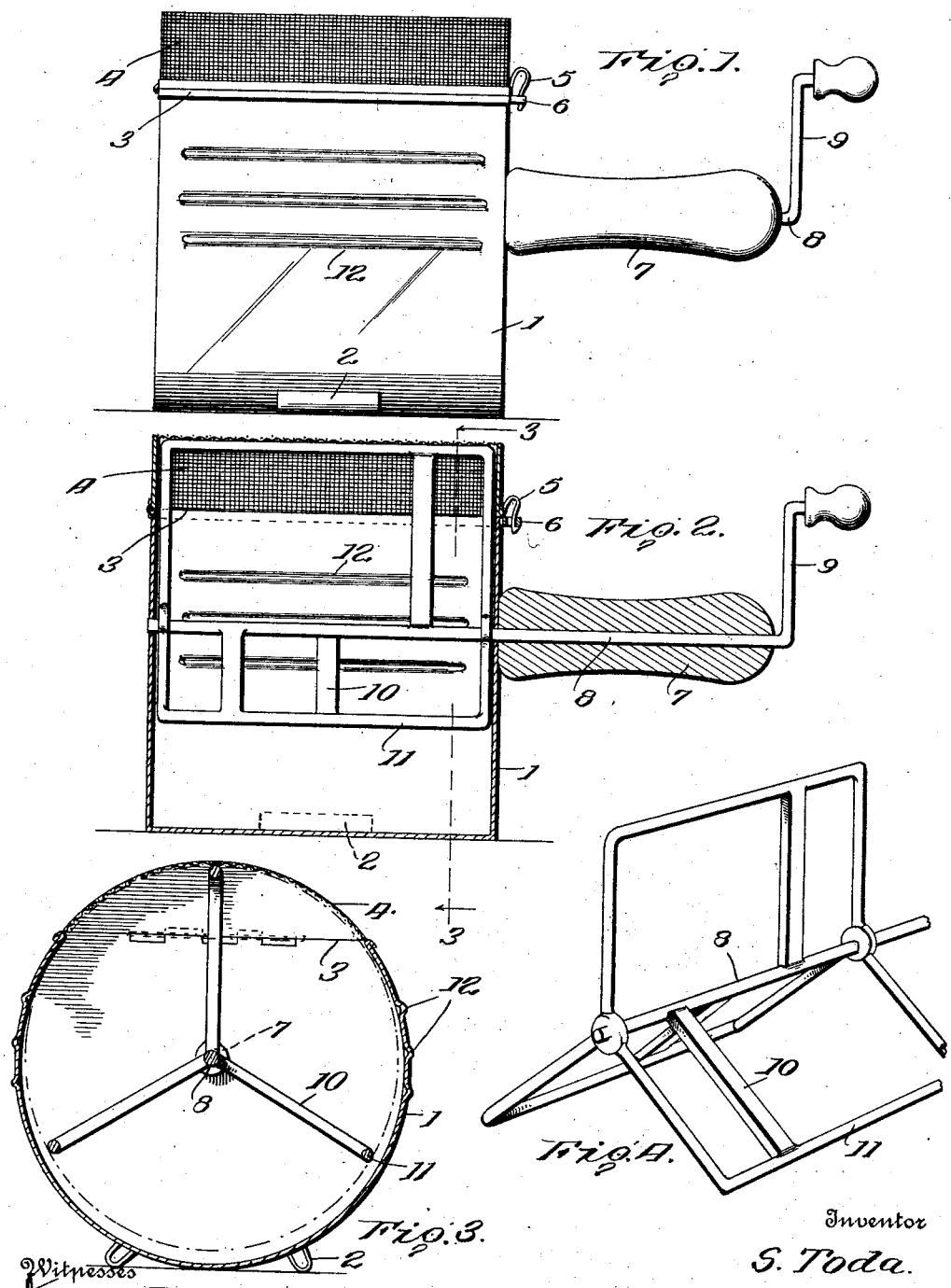

SOZABURO TODA, OF NEW YORK, N. Y.

COMBINED MIXER AND SIFTER.

1,062,059. Specification of Letters Patent. Patented May 20, 1913.

Application filed April 25, 1912. Serial No. 693,228.

*To all whom it may concern:*

Be it known that I, SOZABURO TODA, citizen of Japan, residing at New York, in the county of New York and State of New York, have invented certain new and useful Improvements in Combined Mixers and Sifters, of which the following is a specification.

This invention has relation to mixers and sifters especially adapted to be used for mixing the ingredients of bread or cake.

With the above object in view, the mixer and sifter includes a cylindrical body having an opening which is normally closed by a sieve. The body is provided at one end with a handle which is positioned slightly off the center of the body. A shaft is journaled in said handle and extends into the body, and is provided with a crank handle. Beating and mixing arms and members are mounted upon the said shaft within the body and are adapted to rotate about the axis of the shaft which is journaled in the handle.

For a full understanding of the invention, reference is to be had to the following description and accompanying drawings in which:

Figure 1 is a side elevation of the mixer and sifter. Fig. 2 is a vertical section view of the same. Fig. 3 is a transverse sectional view of the same cut on the line 3—3 of Fig. 2. Fig. 4 is a perspective view of a shaft and attached parts used in the mixer and sifter.

Corresponding and like parts are referred to in the following description and indicated in all the views of the accompanying drawings by the same reference characters.

The mixer and sifter consist of a cylindrical body 1 having at one side portion feet 2 which are adapted to rest upon a table top, or other support, when the device is used for mixing different materials. The body 1 is provided at that side opposite the side portion thereof upon which the feet 2 are mounted with an opening 3. A sieve 4 is hinged to the body 1 at one side of the opening 3 and is provided at its free edge portion with a catch 5 which is adapted to engage a keeper 6 mounted upon the body 1. The sieve 4 is curved transversely and conforms to the general contour of the body 1—that is to say, that with the sieve closed, the said sieve completes the cylindrical form of the device. A handle 7 is positioned upon one end of the body 1 slightly off the center thereof. A shaft 8 is journaled in the handle 7 and passes through the same. One end of the shaft 8 projects into the body 1 and extends approximately along the entire length thereof. A crank handle 9 is fixed to the outer end of the shaft 8 beyond the end of the handle 7. Beating and mixing bars 10 are fixed to the shaft 8 within the body 1. These bars are arranged in sets, and the members of each set are connected together by horizontal rods 11. The rods 11 are located at the outer ends of the beaters or mixers 10. The beating or mixing bars 10 are of a length so that the rods 11 will move in close contact with the inner surface of the sieve 4, but when the said rods are down in the body 1 they are spaced slightly from the inner surface of the body and, consequently, do not engage the same as they rotate about the axis of the shaft 8, and they do not scratch against the surface of the body 1.

The body 1 is provided in its side with a series of graduations 12, and these graduations are intended to indicate the quantity of the material which is located in the body. The graduations may indicate pounds and fractions thereof, and pints and quarts or fractions thereof. These graduations are formed by pressing the metal which constitutes the side of the body 1 in an upward direction so that the graduations may be seen both inside the body and at the outside thereof.

When the device is used for mixing materials the body 1 is placed upon a support with the feet 7 resting directly upon the said support. The ingredients are then placed in the body 1 through the opening 3 and the sieve 4 is closed down about the edges of the said opening 3. The operator then grasps the handle 7 with one hand and the crank handle 9 with the other and rotates the shaft 8 by turning the said crank handle. This carries around the beaters or mixers 10 and the rods 11, and the ingredients are thoroughly and quickly mixed. After the mixing operation has been completed, the body 1 may be turned over so that the sieve 4 is at a lower position, and by rotating the shaft 8 the contents of the body 1 will be forced by the rods 11 out through the mesh of the sieve and thus the mixed ingredients are sifted.

Having described the invention, what is claimed is:

1. A sifter and mixer comprising a body having an opening, a curved sieve hinged to the body and arranged to lie over said opening, a handle mounted at the end of the body and located eccentrically thereon, a shaft journaled in the handle and extending into the body, means for turning the shaft, and mixing and sifting members mounted on the shaft and located in the body and arranged to move in close contact with the sieve but out of contact with the surface of the body.

2. A mixer and sifter comprising a body having an opening and a sieve hinged to the body and arranged to lie over said opening, a handle fixed to the end of the body and located eccentrically, a shaft journaled in the handle and extending into the body, mixing members carried by the shaft, and a handle mounted upon the shaft.

In testimony whereof I affix my signature in presence of two witnesses.

SOZABURO TODA. [L. S.]

Witnesses:
    CARL A. KARLSON,
    CHARLOTTE E. KARLSON.

---

Copies of this patent may be obtained for five cents each, by addressing the "Commissioner of Patents, Washington, D. C."